Figure 1:
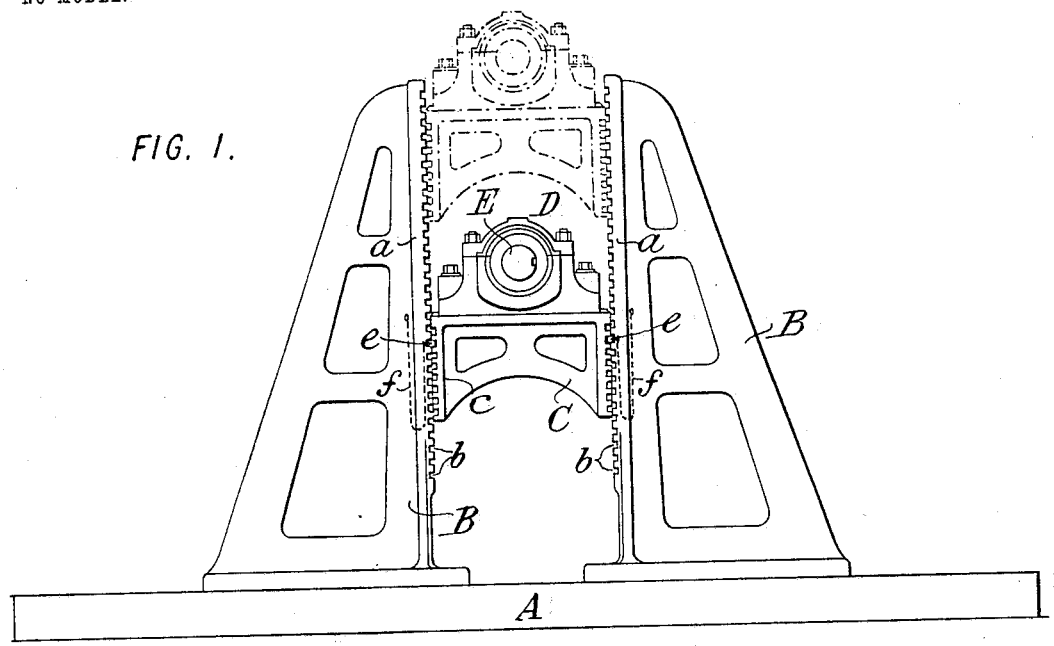

No. 758,880. PATENTED MAY 3, 1904.
J. J. WOOD.
MACHINE FOR TESTING DYNAMOS.
APPLICATION FILED AUG. 4, 1903.
NO MODEL. 5 SHEETS—SHEET 1.

WITNESSES:
Fred White
René Bruine

INVENTOR:
James J. Wood,
By Attorneys,
Arthur E. Fraser

No. 758,880. PATENTED MAY 3, 1904.
J. J. WOOD.
MACHINE FOR TESTING DYNAMOS.
APPLICATION FILED AUG. 4, 1903.
NO MODEL. 5 SHEETS—SHEET 2.

WITNESSES:
Fred White
Rene Bruine

INVENTOR:
James J. Wood,
By Attorneys,

No. 758,880. PATENTED MAY 3, 1904.
J. J. WOOD.
MACHINE FOR TESTING DYNAMOS.
APPLICATION FILED AUG. 4, 1903.
NO MODEL. 5 SHEETS—SHEET 3.

WITNESSES:
Fred White
René Brune

INVENTOR:
James J. Wood,
By Attorneys,

No. 758,880. PATENTED MAY 3, 1904.
J. J. WOOD.
MACHINE FOR TESTING DYNAMOS.
APPLICATION FILED AUG. 4, 1903.
NO MODEL. 5 SHEETS—SHEET 4.

WITNESSES:
Rene Bruine
Thomas J Wallace

INVENTOR:
James J. Wood
By Attorneys,
Arthur C. Fraser & Co

No. 758,880. PATENTED MAY 3, 1904.
J. J. WOOD.
MACHINE FOR TESTING DYNAMOS.
APPLICATION FILED AUG. 4, 1903.
NO MODEL. 5 SHEETS—SHEET 5.
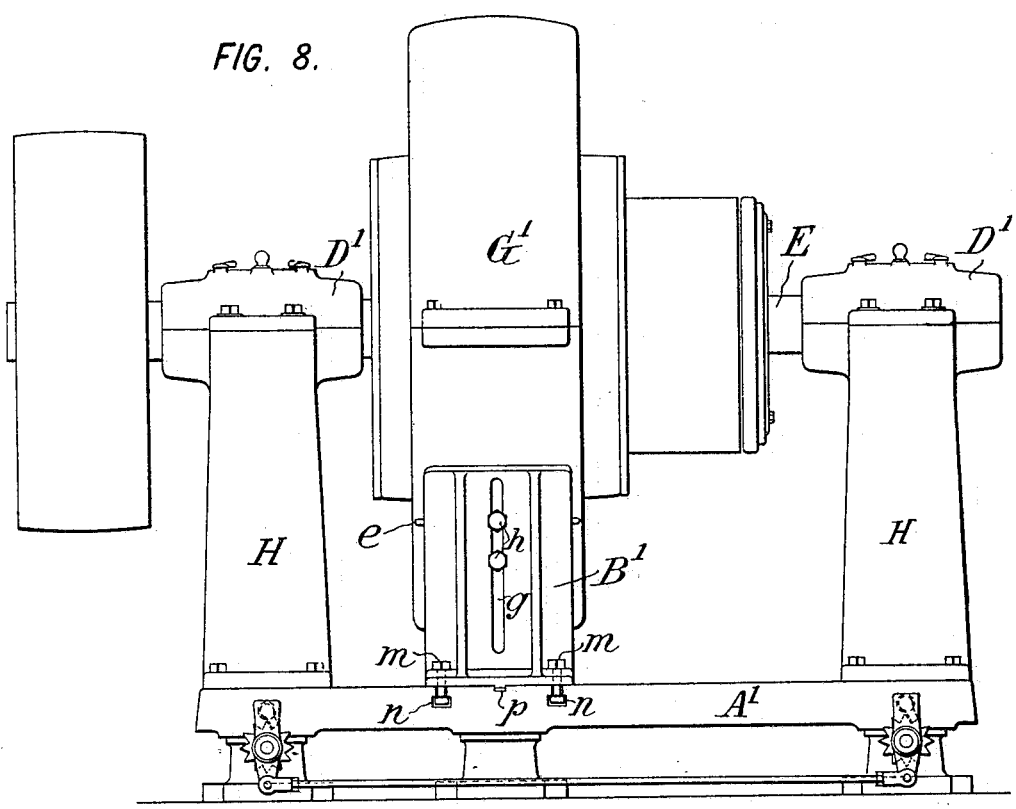
FIG. 8.
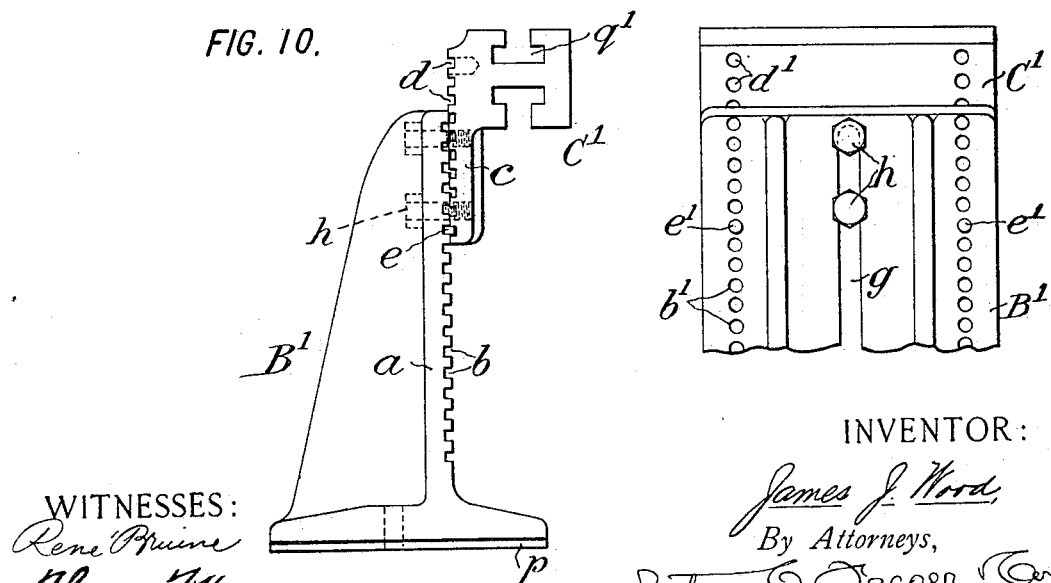
FIG. 10.
FIG. 11.
WITNESSES:
INVENTOR:
James J. Wood
By Attorneys, No. 758,880. Patented May 3, 1904.

UNITED STATES PATENT OFFICE.

JAMES J. WOOD, OF FORT WAYNE, INDIANA.

MACHINE FOR TESTING DYNAMOS.

SPECIFICATION forming part of Letters Patent No. 758,880, dated May 3, 1904.

Application filed August 4, 1903. Serial No. 168,181. (No model.)

*To all whom it may concern:*

Be it known that I, JAMES J. WOOD, a citizen of the United States, residing at Fort Wayne, in the county of Allen and State of Indiana, have invented certain new and useful Improvements in Machines for Testing Dynamos, of which the following is a specification.

The purpose of this invention is to provide a suitable machine upon which the field-magnet and armature of a dynamo may be mounted in correct relation in order that the armature may be revolved in the center of the field for testing purposes—that is, to determine its balance and electrically test its winding while revolving in its appropriate field-magnet.

The machine is especially applicable with what are known as "direct-connected" dynamos or generators—that is to say, those which when set up for use are directly coupled to or built as a part of the steam-engine or other source of power.

In testing direct-connected generators it has been heretofore customary to block up the bearings supporting the armature-shaft or a special shaft upon which the armature was hung for testing until the armature was brought to correct position to revolve in the exact center of the field. This has been a very slow and tedious operation because of the heavy weights to be moved and has also been unsatisfactory, as the bearings could not be bolted to the upright frames or parallels strongly enough to resist the magnetic pull, so that in many instances the armature was drawn over against the field-magnet poles. The testing of belt-driven dynamos has also been attended with difficulty when the bearing-frames and field-magnet are not ready to be assembled in their final positions on their supporting-base.

My invention provides a very simple, effective, and convenient means for accomplishing the requisite support during testing and enabling the armature-bearings and field-magnet to be adjusted in perfect alinement and to any variations in height that are necessary to bring them to the correct relative positions.

My new machine comprises means for fixedly supporting one member of the dynamo and for adjustably supporting the other member thereof on vertically-adjustable supports. These supports are fastened against upright columns or pedestals, to which they may be confined at any desired elevation. The pedestals on their vertical faces are formed with transverse grooves equidistantly spaced, while the abutting faces of the supports are formed with like grooves spaced either closer together or wider apart than those of the pedestals, so that by adjusting the supports to the desired height and inserting keys in the slots formed by the grooves which coincide the supports are firmly and securely upheld at the desired elevation. By reason of the different spacing of the respective series of grooves a vernier adjustment is secured, providing for an almost infinite number of gradations in the elevation of the supports, while enabling fastening means of adequate strength to be used.

My invention is shown in the accompanying drawings, wherein—

Figure 2:
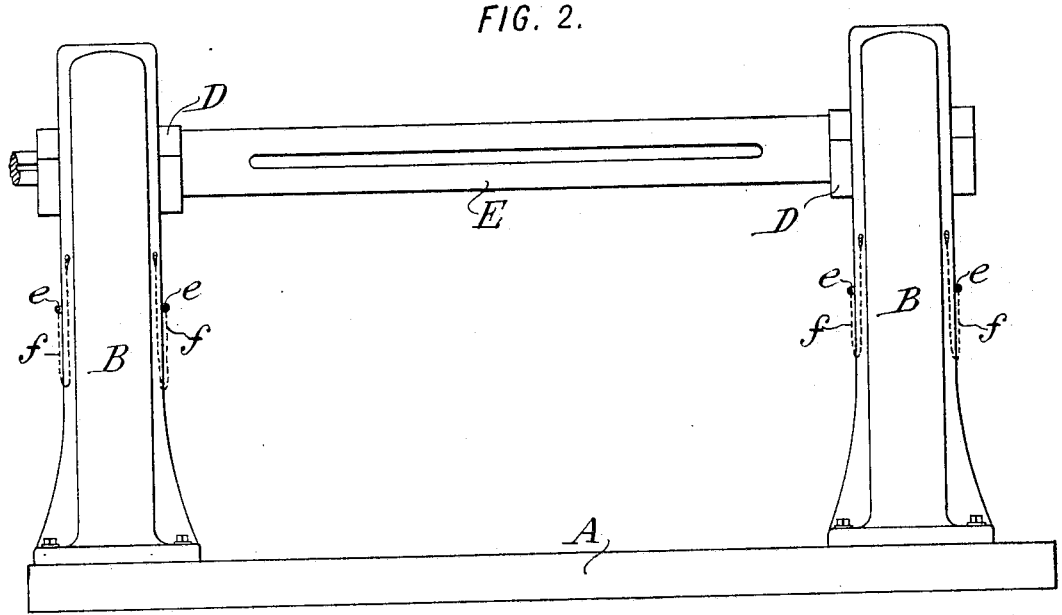
Figure 3:
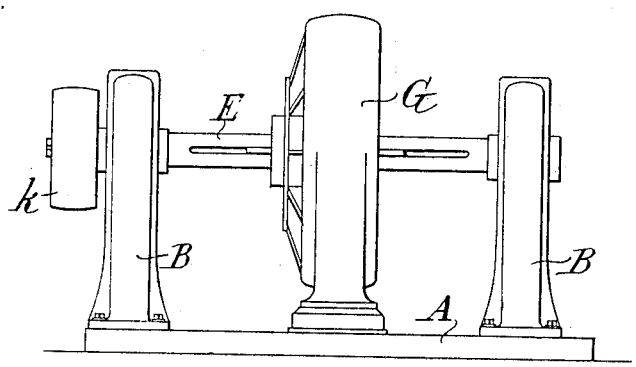
Figure 4:
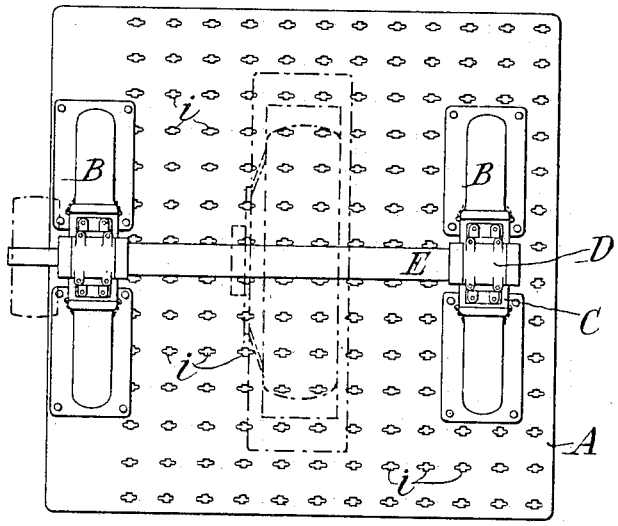
Figure 5:
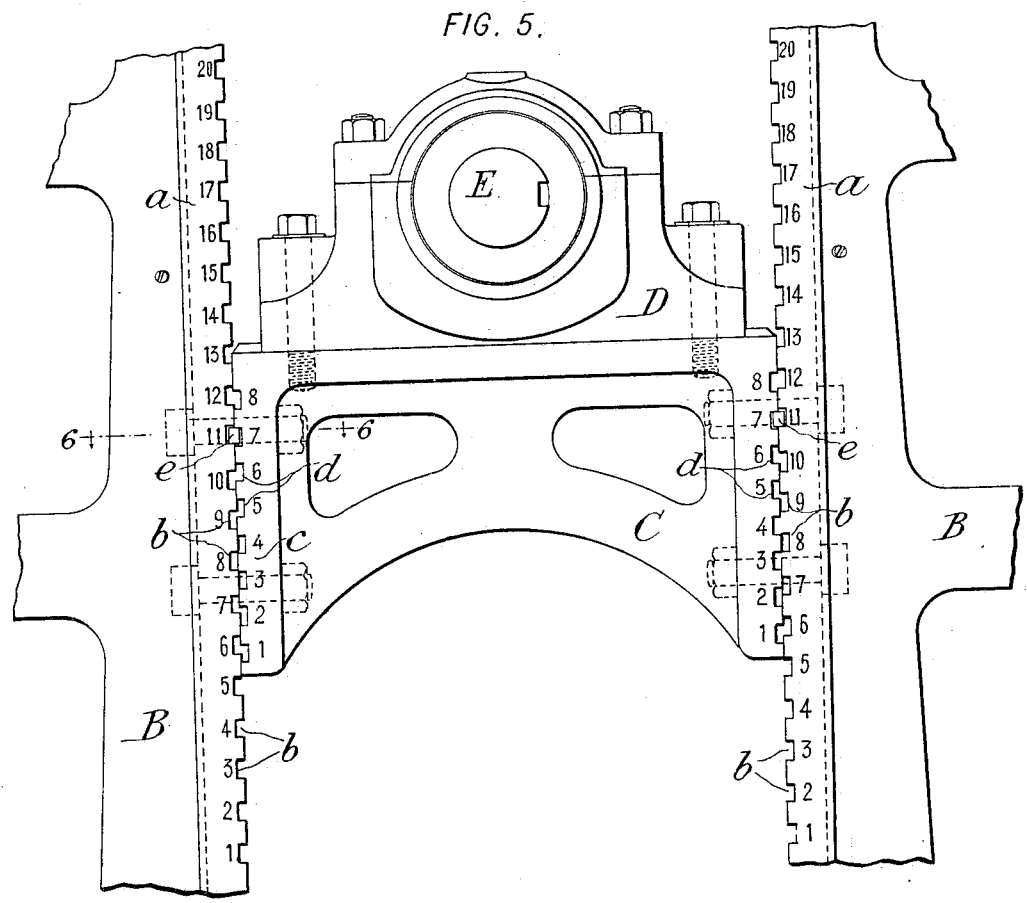
Figure 6:
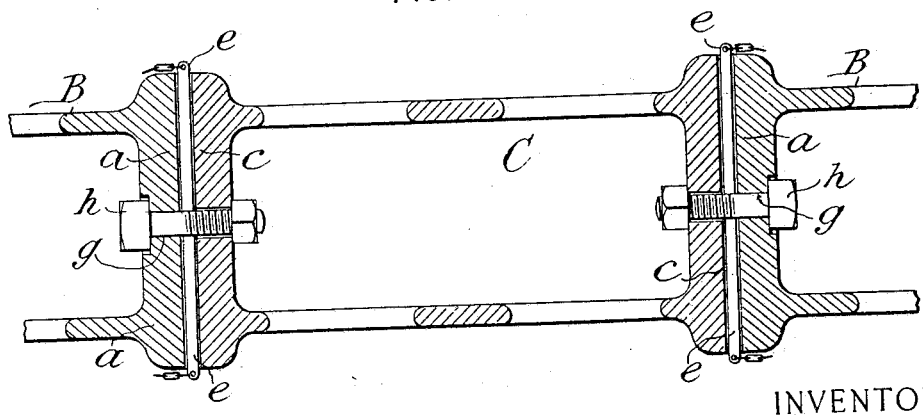
Figure 7:
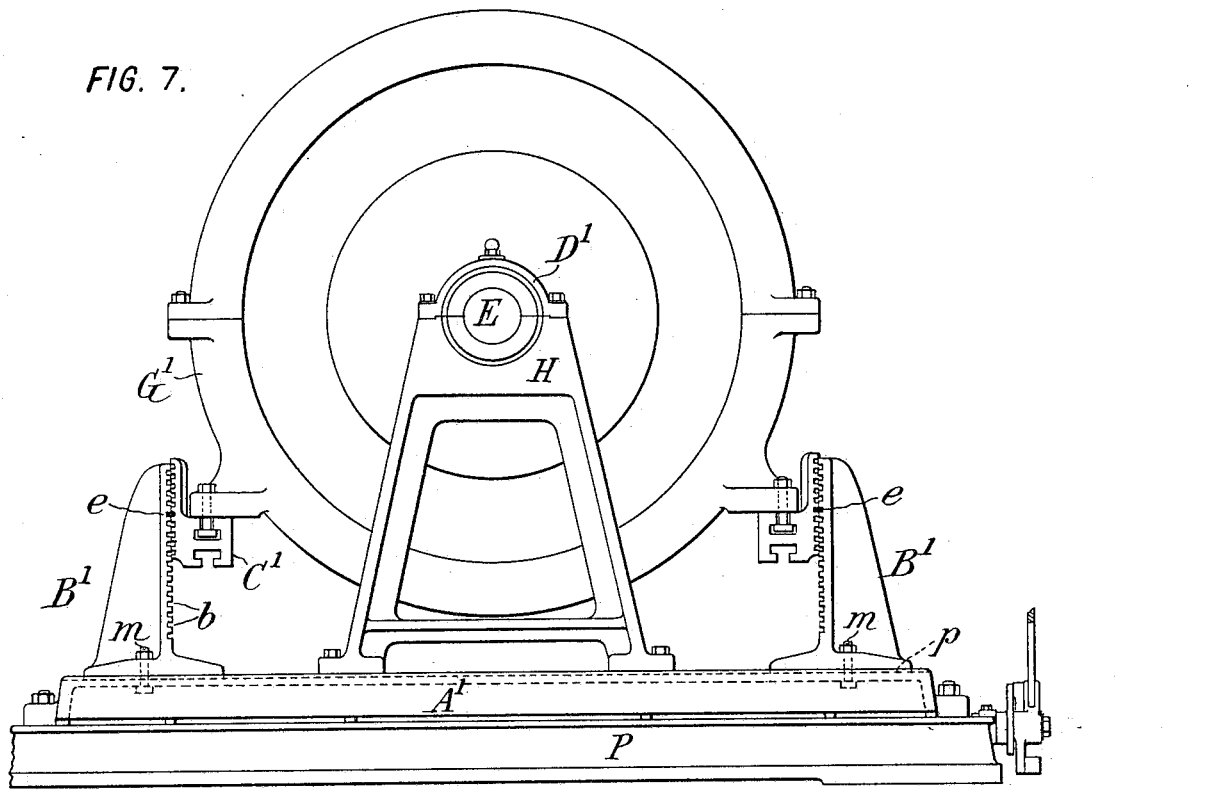
Figure 9:
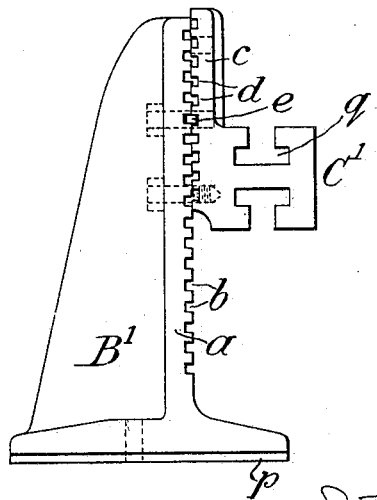

Figure 1 is an end elevation of one form of the apparatus. Fig. 2 is a side elevation thereof. Fig. 3 is a side elevation on a smaller scale, showing it in use. Fig. 4 is a plan on the same scale as Fig. 3. Fig. 5 is a fragmentary view, being an enlargement of a portion of Fig. 1. Fig. 6 is a horizontal section on the line 6 6 in Fig. 5. Fig. 7 is an end elevation of a modification. Fig. 8 is a side elevation thereof. Fig. 9 is an enlargement of part of Fig. 7. Fig. 10 shows part of Fig. 9 inverted. Fig. 11 is a rear view of Fig. 10, showing a modification.

Referring to Figs. 1 to 6, let A designate the base-plate of the testing-machine, on which are erected four upright frames B B, which I will call "pedestals." These pedestals are arranged in pairs facing each other, their approaching sides being vertical, so as to leave between them a parallel vertical space, which is crossed by a support or bridge C, adjustable to varying heights. The two bridges C C carry bearings D D for the shaft E, which is to carry the armature during testing, and which to distinguish it from the permanent armature-shaft is called the "testing-shaft." All these parts belong only to the testing-machine and form no part of the dynamo or generator to be tested. The inner or upright faces of the pedestals B B are made as broad flanges or plates *a a*, in which are cut horizontal grooves *b b*. Each bridge C has its outer ends, which fit against the flange-faces *a a*, constructed as similar broad flanges or plates *c c*, across which are cut horizontal grooves *d d*. The grooves *b b* in the pedestals have a certain equal spacing, the opposite grooves being at equal heights. The grooves *d d* in the bridge-pieces have a spacing which is either wider or closer than that of the grooves *b b*, so that when any one groove *d* registers with any one groove *b* the two form a slot into which may be inserted a key *e*. By adjusting the bridges to the desired height and inserting the keys *e e* into the coinciding grooves the bridges will be upheld by the keys, the latter being made, preferably, of steel of suitable hardness to resist the shearing strains. I have shown four keys *e e* for each bridge, two being inserted at each end of the bridge from opposite sides. These keys are preferably connected by chains *f f* to an intermediate fastening-point to prevent their becoming lost. To properly guide the bridges as they are raised or lowered and prevent their becoming laterally displaced, any suitable guides may be provided. For this purpose I have shown the pedestals as formed each with a vertical slot *g* through its plate or flange *a*, into which slot enter two bolts *h h*, carried by the bridge, this arrangement being duplicated at the opposite end of the bridge. These bolts enable the bridge to be fastened rigidly to the pedestals when finally adjusted to position by tightening the nuts on the bolts.

The mode of use of this apparatus will now be explained. Let us assume that a generator of any given size within the capacity of the machine is to be tested. In Fig. 3 I have shown an example of such generator at G, and the same is shown in dotted lines in Fig. 4. The field-magnet of the generator is put in place on the base A and is bolted or clamped down firmly to the base. To facilitate this, the base is formed with frequent slots *i i*, into which any suitable sort of clamping device may be inserted whereby to clamp down the base or subbase of the generator field-magnet to the base-plate A. The manner of such attachment is well known and is not shown. The armature of the generator is keyed on the testing-shaft E. If too large to fit the shaft, any known or suitable bushing or expanding bushing is interposed. The bearings for the testing-shaft being bolted in place upon the bridges C C, these bridges are raised or lowered in any suitable way—as, for example, by a crane—to bring them to the desired height, whereupon the keys *e e* are inserted, the bridges being then let down, so that their weight shall rest upon the keys. The testing-shaft and armature being put in place, the field-magnet is moved along on the base-plate to bring it into proper relation with the armature and then clamped fast. Any suitable source of power is then applied to a pulley *k* on the end of the testing-shaft—as, for example, by belting to an electromotor—and the necessary tests for the generator in question are then made. The operation of bringing the bridges and bearings to the right height is greatly facilitated by consecutively numbering the grooves in the pedestals, so that grooves of the same height in the four pedestals shall all bear the same number, and by consecutively numbering in like manner the grooves in the bridges, as is shown in Fig. 5. It is then only necessary to prepare a table giving the height of the shaft-axis for each different juxtaposition of grooves in the pedestals and bridges. Hence for testing a generator the armature center of which requires to be a given height above its subbase—for example, fifty-two and seven-sixteenth inches—it is only necessary to refer on the table to this dimension, opposite which are found the numbers of the pedestal-grooves and bridge-grooves which must receive the keys—for example, bridge-groove number "2" and pedestal-groove number "4." My invention thus enables the armature-testing shaft to be brought at once and without experiment to exactly the correct height. When the like-numbered grooves are brought respectively into coincidence on both the bridges, absolutely correct alinement of the shaft is assured. The exact coincidence in height of the several grooves on the pedestals is assured by mounting them with their plates *a a* all in the same plane and by planing out the grooves simultaneously across the four pedestals. Hence if any inequalities in spacing occur they are reproduced in the four pedestals. By preference the grooves in both the bridges and pedestals are narrower than the metal surfaces between them, so that the bridge-surface moves against the pedestal-surface and is guided by it in the same manner as if there were no grooves. After completing any testing or whenever it is desired to change the height of the bearings the keys can easily be pulled out of the slots by hand as soon as the weight is lifted, as by a crane.

Figs. 7 and 8 show a testing-machine adapted for testing a different type of dynamo—that is to say, a comparatively small dynamo which is belt-driven, the field-frame sitting down in the base. It is often desirable to test such dynamos before fitting the field-magnet and armature-bearing pedestals to the base. For these smaller dynamos I prefer to mount the armature-shaft in fixed bearings and provide adjustable supports for the field-magnet. Hence instead of constructing the adjustable supports as bridges, which sustain the shaft-bearings, I construct them as brackets, to which the field-magnet flanges are bolted. These supports instead of bridging across from one pedestal to another fasten each to one pedestal, and to accommodate field-magnets of different widths the pedestals themselves are made adjustable toward and from a common center. This testing-machine is constructed with a main base P and an upper or sliding base A'. On the base A' are fixedly mounted two bearing-pedestals H H, carrying the bearings D' for the armature-shaft or armature-testing shaft E. Two pedestals B' B' are mounted on the base A' and fastened thereto by bolts $m$ $m$, so that they can be adjusted to different distances apart, being guided in this adjustment by a rib and groove $p$. The bolts $m$ have their heads in undercut slots $n$ $n$, parallel with the grooves $p$, so that by loosening the bolts the pedestals can be slid toward or from each other and the bolts retightened. The pedestals have the same wide vertical flange $a$, with horizontal grooves $b$ $b$, as in the first construction. The supports which are carried by the pedestals are brackets C' C' and are constructed with broad vertical flanges $c$ and horizontal grooves $d$ $d$, like the supporting-bridges first described. The grooves $b$ $d$ are differently spaced to form a vernier, as before, and a like key $e$ is inserted in the coinciding grooves to hold the brackets at the desired height. The brackets have undercut slots $q$ to be engaged by the bolts which fasten the feet or bottom flanges of the dynamo field-magnet frame G'. To accommodate smaller dynamos than that shown, the brackets are reversible, as shown in Fig. 10, and have slots $q'$, which in this inverted position are engaged by the dynamo-bolts. By making the brackets thus reversible the total height of the pedestals is made available for adjustment, thereby giving the extreme range of adjustment for a given height of pedestal. The brackets are fastened to the pedestals by screws or bolts $h$, sliding in vertical slots $g$, as in the construction first described, these bolts being tightened after the vertical adjustment is made. To invert the bracket, it is necessary to remove one of these bolts and replace it. After testing a dynamo of one size it is only necessary in order to adjust the testing-machine to one of different size to move the pedestals B' equally out or in and to set the brackets C' equally up or down to suit the dimensions of the dynamo-frame. As this machine is for testing belt-driven dynamos, it is necessary to provide some means for tightening the belt. For this purpose I construct the base A' to slide on the under base P. I have shown for this purpose the means for adjustment set forth in my Patent No. 526,066, of September 18, 1894.

My invention is susceptible of considerable modification without departing from its essential features. For example, the vernier adjustment may be differently constructed, since instead of coinciding grooves in the fixed and movable members entered by a key any other suitable form of sockets may be provided, which when brought into coincidence may be engaged by any suitable locking part. Thus, for example, the pedestals and supports may be provided with vertical series of holes, those in the pedestals having one spacing and those in the supports a different spacing, and pins may enter those holes which are brought into coincidence. This construction is shown in Fig. 11, where $b'$ are the holes in the pedestal and $d'$ are those in the support, the coinciding holes being entered by pins $e'$. The construction is not otherwise different from that shown in Fig. 10.

What I claim is—

1. A machine for testing dynamos comprising a base-plate, upright pedestals fixed thereon, and vertically-adjustable supports carried by said pedestals, said supports and pedestals having reciprocal recesses and keys for fastening the supports to the pedestals at varying heights.

2. A machine for testing dynamos comprising a base-plate, upright pedestals fixed thereon, and vertically-adjustable supports carried by said pedestals, said pedestals having successively-numbered grooves with those of like number at the same level, and said supports having fastening means engaging said grooves, whereby when both supports are fastened to grooves of like number their uniform level is assured.

3. A machine for testing dynamos comprising a base-plate, upright pedestals fixed thereon, vertically-adjustable supports carried by said pedestals, said pedestals having each a like vertical series of equidistant recesses, and said supports having each a like vertical series of equidistant recesses of a spacing different from those of the pedestals, to form a vernier, and fastening means for uniting the supports to the pedestals with any corresponding recesses in operative relations.

4. A machine for testing dynamos comprising a base-plate, upright pedestals fixed thereon, vertically-adjustable supports carried by said pedestals, said pedestals having corresponding horizontal grooves of a uniform spacing, and said supports having horizontal grooves of a uniform spacing different from that of the pedestal-grooves, to form a vernier, and keys adapted to be inserted in the coinciding grooves.

5. A machine for testing dynamos comprising a base-plate, upright pedestals fixed thereon, vertically-adjustable supports carried by said pedestals, said supports and pedestals having reciprocal provisions for upholding the supports at varying heights, and vertical guides for preventing lateral displacement of the supports.

6. A machine for testing dynamos comprising a base-plate, upright pedestals fixed thereon, vertically-adjustable supports carried by said pedestals, said supports and pedestals having reciprocal provisions for upholding the supports at varying heights, vertical guides for preventing lateral displacement of the supports, and bolts for clamping the supports to the respective pedestals.

7. A machine for testing dynamos comprising a base-plate having provisions to admit of fastening the dynamo field-base thereto, upright pedestals fixed thereon, vertically-adjustable bridges carried by said pedestals, bearings mounted on said bridges, and a testing-shaft for carrying the armature mounted in said bearings, said bridges and pedestals having reciprocal provisions for fastening the bridges to the pedestals at varying heights.

8. A machine for testing dynamos comprising a base-plate having provisions to admit of fastening the dynamo field-base thereto, upright pedestals fixed thereon, vertically-adjustable bridges carried by said pedestals, bearings mounted on said bridges, and a testing-shaft for carrying the armature mounted in said bearings, said pedestals having corresponding horizontal grooves, and said bridges having horizontal grooves adapted to be brought into coincidence at successive heights with the successive grooves in the pedestals, and keys adapted to be inserted in the coinciding grooves.

In witness whereof I have hereunto signed my name in the presence of two subscribing witnesses.

JAMES J. WOOD.

Witnesses:
EDWARD A. BARNES,
THOS. W. BEHAN.